April 20, 1943. C. H. EVANS 2,316,848
APPARATUS FOR REGULATING THE FLOW OF LIQUID
Filed July 3, 1940 4 Sheets-Sheet 1

Inventor
C. H. Evans
by
W. E. Evans
Attorney

Patented Apr. 20, 1943

2,316,848

UNITED STATES PATENT OFFICE 2,316,848

APPARATUS FOR REGULATING THE FLOW OF LIQUID

Cyril Harry Evans, Snaresbrook, London, England, assignor to Spillers Limited, Markyate, near St. Albans, England, a British company Application July 3, 1940, Serial No. 343,798
In Great Britain July 8, 1939

13 Claims. (Cl. 137—68)

The invention relates to an apparatus for the regulation of liquid flow, particularly in apparatus for the delivery of a constant flow of liquid under a constant head maintained in relation to the outlet of the apparatus. The invention is of particular application where a small flow of liquid is to be controlled.

The invention has among its objects to provide apparatus which will be effective to maintain a substantially constant flow at a predetermined rate, whilst providing a wide range of adjustment for the rate of flow with a small and compact apparatus.

The invention has further among its objects to ensure that the constant flow may be maintained irrespective of whether the pressure at the delivery is at, above or below atmospheric pressure prevailing.

It is known that the flow of liquid through an orifice is dependent upon the head or pressure of the liquid, disregarding any characteristics of the liquid itself which might affect the rate of flow, such as viscosity, temperature and the like. Thus, if the head is maintained constant, as by means of an overflow valve or a ball valve or any other suitable device, provided the size of the orifice remains the same and the orifice is unobstructed, a substantially constant flow of liquid is obtained.

It is usual for the flow of liquid to be regulated by adjustment either of the size of the orifice or of the head of liquid or in some cases by regulation of the pressure of the air or gas above the liquid. The change in size of the orifice necessary to ensure a very small variation in the rate of flow, however, is so minute as to be almost impossible to secure by mechanical means with any degree of exactitude. Again, while regulation of the rate of flow of a liquid by variation of the head is itself relatively a simple matter, in order to secure a wide range of variation, for example from about 1 to 10, an enormous variation in the head of the liquid is necessary; thus regulation in this manner is limited by the size of the apparatus.

The apparatus according to the invention overcomes the disadvantages of the known methods and provide for the regulation of the rate of flow in both large and small flows of liquid.

According to the invention regulation of the rate of flow is effected by varying the head of the liquid and simultaneously effecting a variation in the cross-sectional area of the flow of liquid delivered by the apparatus.

According to the invention, moreover, flow controlling apparatus is provided to maintain a constant head, comprising a vessel through which the liquid flows, having two or more openings or orifices, serving as inlets and outlets with reference to the said vessel, the control means for the inlet orifices and the outlet orifices being inter-connected in such manner that a movement to open or close an inlet opening serves automatically to effect an adjusting movement in the corresponding outlet opening, whereby the constant head can be readily varied within relatively wide limits in a small and compact apparatus, while at the same time the outlet opening or delivery orifice is adjusted in cross-sectional area within very fine limits over a wide range of adjustment. Thus, the apparatus may include a float chamber connected between the supply and the delivery and a float mounted in the float chamber and carrying oppositely directed tapering needles which project respectively into the openings of the inlet to and outlet from the float chamber so that a movement of the inlet opening with reference to the tapering needle projecting thereinto serves to vary the head of liquid and results automatically in an adjustment of the relative position of the needle in the outlet opening so as to increase or decrease the effective area of the orifice. Thus simultaneously with a variation of the head there is automatically secured a variation in size of the outlet orifice, together with the advantages of the combined adjustments.

According to the invention furthermore, the pressure below the inlet of the apparatus is maintained the same as the pressure below the outlet, and this condition may be secured by placing the space below the inlet in communication, as by pipes or tubes, with the space below the outlet, thus avoiding the effect of a difference in pressure in varying the flow of liquid through the apparatus.

The invention further comprises the features of construction hereinafter described.

The invention is illustrated by way of example in the accompanying diagrammatic drawings.

Figure 1:
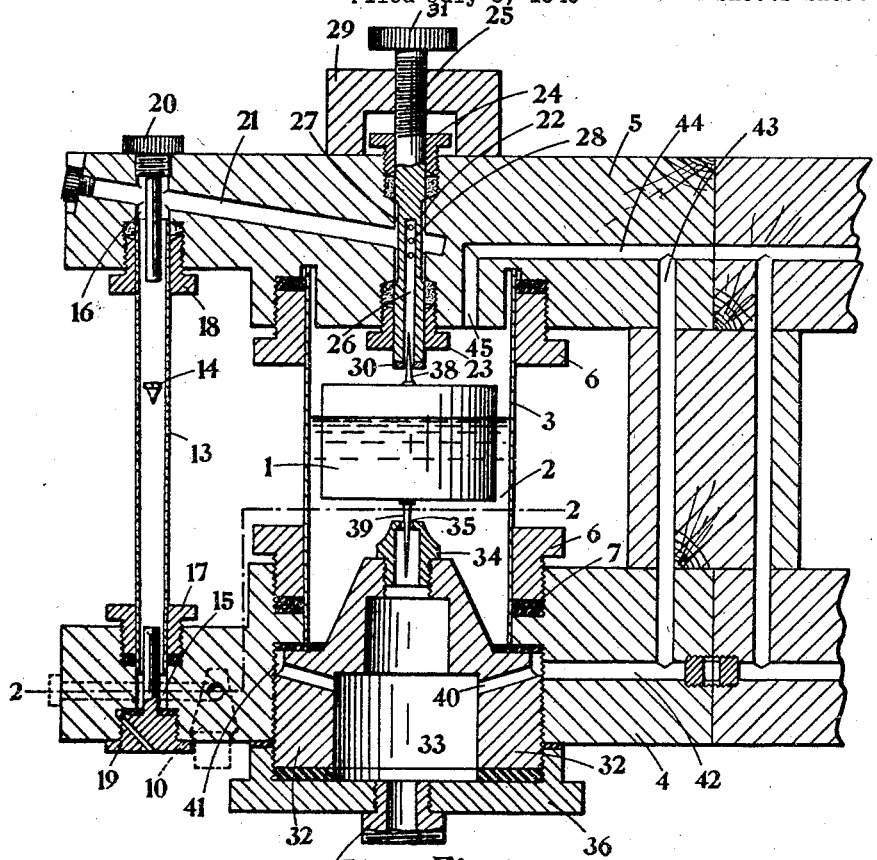
Figure 1 is a sectional elevation of a construction of the apparatus according to the invention.
Figure 2:
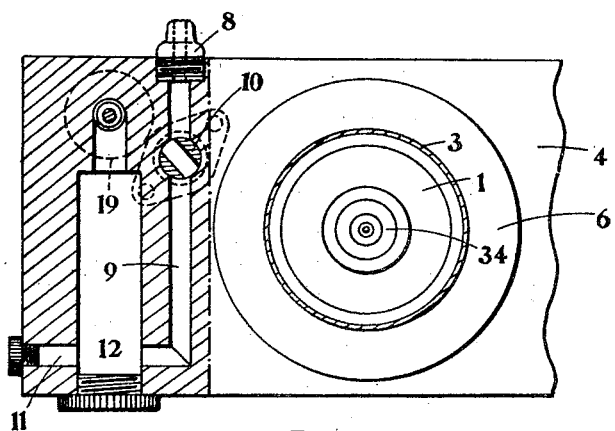
Figure 2 is a sectional plan view on the line 2—2 of Figure 1.

In carrying the invention into effect according to the construction represented in Figures 1 and 2 of the accompanying drawings, a float 1 of a suitable material is disposed within a float chamber 2 formed by a cylinder 3 of transparent material, such as glass, mounted between and suitably seated in a base block 4 and closed by a closure block 5. For this purpose the base block 4 and the closure block 5 are provided with annular seatings for the ends of the glass cylinder 3 and liquid-tight and pressure-tight seals are provided by means of glands 6, serving to compress suitable packing rings 7 in the annular seatings within the blocks 4 and 5. The blocks are maintained in fixed relation.

The liquid to be fed to the float chamber 2 is supplied by way of a connector 8 in the lower block 4, which connector communicates with a passage 9 provided with a control cock 10 and leads to a transverse passage 11 by which communication is effected with a chamber 12 in which is packed a filter material such as glass wool. From the filter chamber 12 the liquid passes to a flow meter comprising a conical or tapered tube 13 in which is disposed an indicating float 14, the tube 13 being received into bores 15 and 16 provided respectively in the blocks 4 and 5, the tube being maintained liquid-tight by means of glands 17 and 18 serving to compress resilient washers or packing in the stuffing boxes formed respectively in the blocks 4 and 5. The bores 15 and 16 are respectively continued through the blocks 4 and 5 and are closed by means of plugs 19, 20 which are provided with elongated stems. The stem of the plug 19 affords a seating for the float 14 in the event that the liquid level falls considerably, while the stem of the plug 20 is provided of a sufficient length to ensure that in the event that the float 14 rises towards the upper end of the tube 13 it may not pass completely out of sight.

From the flow meter the liquid passes by way of a passage 21 leading to a bore 22 in the block 5, which bore is concentric with the axis of the seating in the block for the cylinder 3. The bore 22 is provided with stuffing boxes and glands 23, 24, through which passes an inlet control element 25 in the form of a cylindrical body or rod that is axially bored from the lower end, as at 26, for a distance of about half its length and is reduced in diameter at 27 at the position at which it traverses the passage 21 in order that the liquid may flow around the said element and may pass by way of perforations 28 into the axial bore 26. The lower end of the inlet control element is provided with an orifice 30 which may be formed in a nozzle piece mounted upon it. The upper end of the element is screw-threaded in order that it may be engaged with a screw thread in a bridge member 29 mounted on the block 5. By means of the screw-thread the inlet control element may be rotated as by a knurled head 31 in order that the nozzle or inlet orifice 30 may be adjusted in the axial direction and thus in relation to the level of liquid in the float chamber 2.

The lower end of the float chamber 2 is closed by a circular screw-threaded plug 32 in which is formed a discharge chamber 33 for the liquid passing from the float chamber. The plug is formed to project axially into the float chamber for the purpose of supporting a fitting 34 provided with an outlet orifice 35, the fitting being removable and exchangeable. The annular space around the axially projecting portion serves as a sump for any deposits and impurities. The discharge chamber 33 is closed by a closure plate 36 engaging the screw-thread of the plug 32 and is provided with a socket 37 for connection with a conduit by which the liquid from the float chamber is to be conveyed away.

The float 1 is provided to carry in axial disposition an upwardly directed tapering needle 38 and a similar but longer needle 39 downwardly directed, the said needles being adapted respectively to enter the inlet orifice 30 and the outlet orifice 35 with clearance. Thus, when it is desired to vary the rate of flow of liquid from the supply the elevation of the orifice 30 with reference to the upwardly directed needle 38 is varied by rotation of the inlet control element 25 by the head 31 so that more or less liquid will flow around the said needle and produce a change in level or head of the liquid in the float chamber. There is thus produced an axial movement of the downwardly extending tapering needle 39 in the outlet orifice 35. Thus, if the inlet control element is raised to increase the flow of liquid into the float chamber the level of liquid in the float chamber will rise carrying with it the float and consequently lifting the needle 39 and increasing the flow through the outlet orifice 35 to an extent corresponding to the final position assumed by the needle 38 in the inlet orifice 30. In this way a wide range of adjustment is possible, the adjustment being effected in simple manner and so as quickly to cause a constant flow at the new rate to be attained. It is further possible to vary the limits within which the flow through the outlet can be varied by replacing the fitting 34 by another with an outlet orifice of lesser or greater size.

In order that the pressure conditions at the inlet to and outlet from the float chamber may be equalised the plug 32 is provided with a number of substantially radial passages 40 leading to an annular space 41 formed by a reduction in the diameter of the plug at the inner end, the space 41 being in communication with a passage 42 in the block 4, which passage is in communication by way of a vertical passage 43 with a passage 44 in the block 5. The latter passage communicates with the float chamber by the passage 45. Thus, any condition of pressure that may exist in the discharge chamber 33 is reproduced in the float chamber 2 in the proximity of the inlet orifice 30.

The apparatus thus comprised serves for the effective control of the flow of a single liquid.

Figure 1 also illustrates the manner in which a second apparatus may be disposed in juxtaposition with the first apparatus and may serve for the control under similar conditions of a second liquid which may be required to mix with the liquid passing from the first apparatus.

Figure 3:
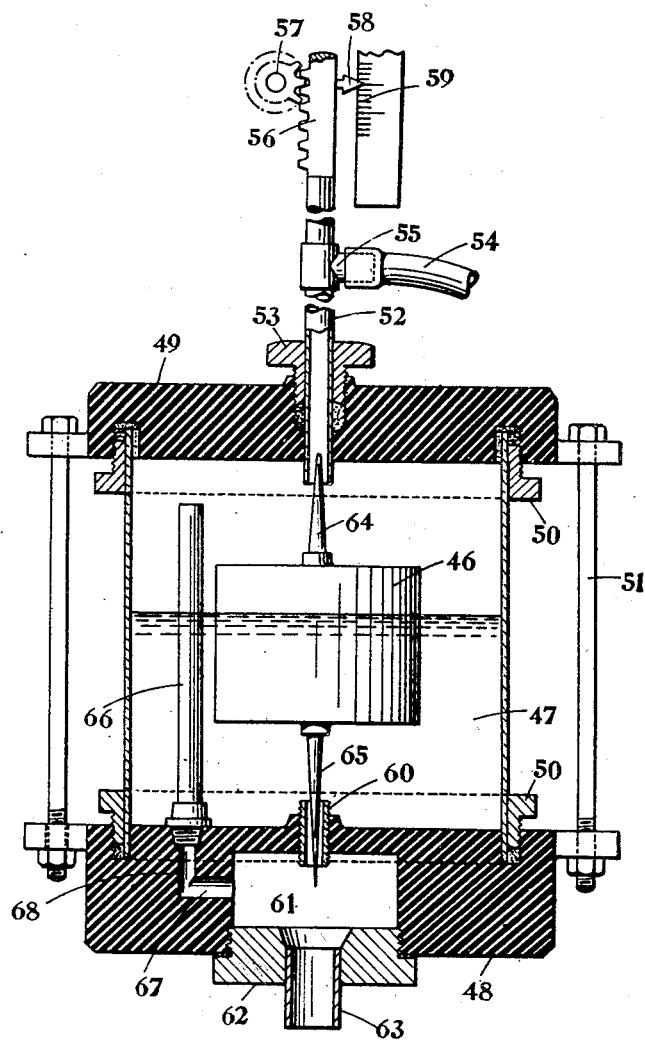
Figure 3 is a sectional elevation of a modification of construction of the apparatus illustrated in Figures 1 and 2.

In the construction of apparatus represented diagrammatically in Figure 3 the float 46 is again disposed within a float chamber 47 comprising a cylinder of glass or other transparent material suitably seated in a base block 48 and in an upper closure block 49, gas and liquid-tight joints with the glass or like cylinder being made by means of the glands 50 adapted to compress suitable packing in the seatings provided for the cylinder in the blocks 48 and 49. The blocks 48 and 49 are maintained in fixed relation by means of distance members or stay bolts 51. The feed of liquid to the float chamber 47 is effected from above through the upper block 49 by way of a tubular inlet control element 52 that is slidably mounted in a stuffing box in the block 49, provided with a gland 53. The liquid is supplied to the element 52 by way of the conduit 54 and a T-union 55. The element 52 is adapted for vertical adjustment through the gland 53 and for the purpose is provided with a rack 56 that is engaged by an operating pinion 57 adapted to be rotated as, for example, by means of a handle or the like. A pointer 58 in fixed relation to the rack 56 is adapted to indicate the movement of the inlet element on a scale 59.

The oulet from the float chamber is provided at the upper end of a length of tube 60 that is screw-threaded to engage a screw-thread in the block 48 and has a calibrated orifice at the upper end. The tube is adapted for replacement as may be desired merely by removal from the block 48. The outlet tube 60 delivers into a cavity or discharge chamber 61 provided in the block 48, the said chamber being closed by a closure plug 62 provided with a delivery socket 63 for connection with a conduit leading the liquid away. The plug 62 is advantageously screw-threaded to engage a screw-thread formed at the outer end of the cavity 61 and a tight joint is made by means of a washer engaged between the block 48 and the head of the plug 62. The float 46 is provided, as in the construction according to Figures 1 and 2, to carry two tapering needles 64, 65 in oppositely disposed positions above and below it so that the needle 64 may co-operate with the orifice of the inlet control element 52, while the needle 65 co-operates with the outlet tube 60. Thus, according as the inlet element is adjusted in position by means of the pinion 57 and the rack 56 so a difference of head is produced in the float chamber 47 resulting in an adjustment of the position of the float 46 and consequent variation of the flow of liquid through the outlet tube 60.

The cavity or discharge chamber 61 is in communication by means of a tube 66 with the float chamber 47 at a position in proximity to the orifice of the inlet element 52, the tube 66 being connected with the discharge chamber 61 by passages 67 and 68. The tube 66 thus ensures that the pressure within the float chamber below the inlet control element is the same as that immediately below the outlet tube 60 and thus the effect of any difference of pressure that might otherwise exist at these positions is avoided.

Figure 4:
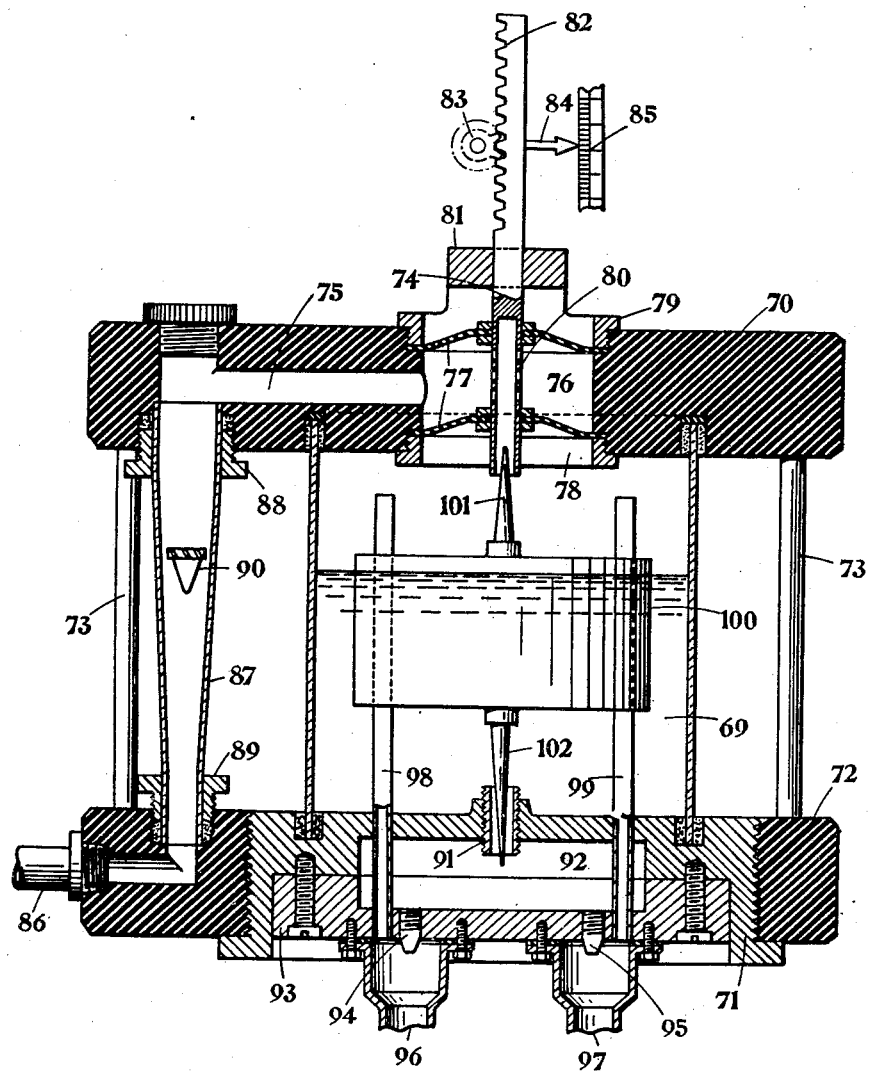
Figure 4 is a sectional elevation of a further modification of construction of the apparatus represented in Figures 1 and 2.

Accordilng to the construction represented diagrammatically in Figure 4, the float chamber 69 again is formed by a cylinder of glass or like matrial suitably seated in an upper closure block 70 and a closure plug 71 that is adapted to be screwed into an annular base member 72 which is maintained in fixed relation to the block 70 by bolts or the like 73. The inlet control element 74 is adapted to be supplied with the liquid by way of a passage 75 in the block 70, which passage leads to a cylindrical cavity or opening 76 also formed in the block 70. The cavity or opening 76 is recessed at the upper and lower ends to form annular seatings for flexible diaphragms 77 which are secured in spaced relation upon the inlet control element 74. The diaphragms are maintained in position by means of annular retaining rings 78, 79 and thus form between them, with the cavity or opening 76, an inlet chamber whence the liquid passes by way of the perforations 80 in the element 74 to the inlet orifice. The element 74 is guided in a bridge member 81 conveniently formed integrally with the ring 79 and adjustment of the element 74 is effected by the means illustrated in Figure 3, that is to say, the inlet control element is in fixed relation to a rack 82 which is engaged by an operating pinion 83. A pointer 84 in fixed relation to the rack 82 may be provided to indicate the movement of the element 74 upon the scale 85.

A flow meter is connected between the supply conduit 86 for the liquid and the passage 75 and comprises a conical tube 87 that is secured in suitable seatings in the block 70 and the fitting 72 by glands 88, 89 and is adapted to contain an indicating float 90.

The outlet tube 91 of the float chamber is mounted centrally in the plug 71 in which is formed the discharge chamber 92 that is closed by the closure plate 93.

Figure 4 further illustrates the division of the controlled flow into a number of streams by the provision of a corresponding number of discharge nozzles 94, 95 which respectively deliver a flow of liquid into the discharge conduit 96 or 97. It will be observed that the flow to the conduits 96 and 97 may be proportioned as desired by suitable calibration of the discharge nozzles 94, 95 which are removable and exchangeable.

In order to secure equalisation of the pressure at the inlet and at each of the discharge nozzles there are provided the tubes 98 and 99 which advantageously serve as guides for the float 100. The latter, as before, is provided to carry the upwardly directed needle 101 for co-operation with the inlet orifice and the needle 102 for co-operation with the outlet tube 91.

Figure 5:
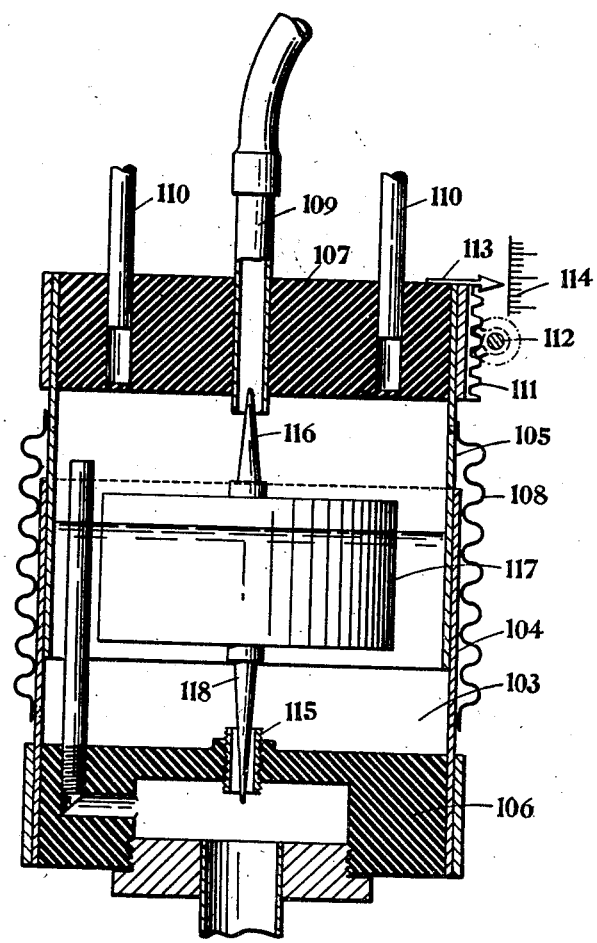
Figure 5 is a sectional elevation of an alternative form of the apparatus according to the invention.

In the modified construction represented diagrammatically in Figure 5 the float chamber 103 is formed with telescopic walls 104, 105 that are respectively secured to a base block 106 and a closure block 107. The walls 104, 105 are connected together by a cylinder 108 of flexible material. The inlet control element 109 is supported in a fixed position in the block 107 which is guided for axial movement by the guide rods 110. Such movement is effected by suitable means such as a rack 111 and operating pinion 112 and, as in the case of the constructions represented in Figures 3 and 4, a pointer 113 may be provided to indicate the movement of the block 107 on the scale 114. It will thus be observed that when it is desired to vary the rate of flow through the outlet tube 115 the block 107 is adjusted in position by the operating pinion 112 and rack 111 so that the orifice of the inlet element 109 is adjusted with reference to the needle 116 carried by the float 117. The consequent variation of level of the liquid in the float chamber 103 effects a readjustment of the position of the needle 118 with respect to the orifice of the outlet tube 115.

The invention is applicable in any method, process or apparatus in which a controlled flow which can be readily varied is required and the invention is not limited to the particular constructions hereinbefore described which are by way of example only.

I claim:

1. Apparatus for delivering a constant flow of liquid under a constant head maintained in relation to the outlet of the apparatus and adapted for regulation of the flow of liquid, comprising a container through which the flow of liquid is maintained and within which the constant head of liquid is established, the said container having an adjustable inlet orifice and an outlet orifice, a control element responsive to a rise or fall of the liquid level within the container, and valve elements supported by the control element and associated respectively with the inlet orifice and the outlet orifice, the valve elements being so arranged with respect to the orifices that when the inlet orifice is adjusted to move away from the valve element associated therewith the head of liquid in the container is increased and the valve element associated with the inlet orifice maintains the increased head while the valve element associated with the outlet orifice moves away from the outlet orifice to increase the flow of liquid therefrom.

2. Apparatus for delivering a constant flow of liquid under a constant head maintained in relation to the outlet of the apparatus and adapted for regulation of the flow of liquid, comprising a container through which the flow of liquid is maintained and within which the constant head is established, the said container having an outlet orifice in the lower part and an inlet orifice disposed vertically above and in axial alignment with the outlet orifice, and a float within the container supporting oppositely disposed and axially aligned needle-like elements adapted to extend respectively into the inlet orifice and the outlet orifice, the forms of the said orifices and the co-operating needle-like elements being such that the effective area of each orifice is varied according to the extent of the entry of the needle-like element into the orifice, and adjustment to increase the inlet orifice resulting in a rise in the level of the liquid in the container and a consequent increase in the effective area of the outlet orifice on the rise of the float.

3. Apparatus for delivering a constant flow of liquid under a constant head maintained in relation to the outlet of the apparatus and adapted for regulation of the flow of liquid, comprising a container through which the flow of liquid is maintained and within which the constant head is established, and having in the lower part an outlet orifice, an axially adjustable inlet control element mounted in the container and supporting an inlet orifice in a position vertically above and in axial alignment with the outlet orifice, and a float within the said container supporting oppositely disposed and axially aligned needles adapted to extend respectively into the inlet orifice and the outlet orifice, so that on a movement of the inlet control element in the direction to withdraw the inlet orifice the effective area of the said orifice is increased with consequent increase of the head of liquid and rise of the float resulting in an increase of the effective area of the outlet orifice.

4. Apparatus according to claim 3, wherein the needle co-operating with the outlet orifice is longer than the needle co-operating with the inlet orifice and is of less sharply tapered form.

5. Apparatus according to claim 3, for proportioning two flows of liquid in a determined ratio for delivery in admixture, comprising for each flow of liquid a container with an adjustable inlet orifice and an outlet orifice and a float with oppositely disposed tapering needles co-operating with the said inlet and outlet orifices, and a common discharge chamber into which the said outlet orifices deliver the respective flows of liquid.

6. Apparatus according to claim 3, wherein a discharge chamber is provided to receive the delivery from the outlet orifice for distribution.

7. Apparatus according to claim 3, wherein a discharge chamber is provided to receive the delivery from the outlet orifice and is provided with a plurality of outlets for subdivision of the flow of liquid.

8. Apparatus according to claim 3, wherein a discharge chamber is provided to receive the delivery from the outlet orifice and is provided with distributing nozzles the cross-sectional areas of which are proportioned to the flows to be determined respectively by them.

9. Apparatus according to claim 3, wherein a pressure equalising conduit is provided to connect the upper part of the container above the liquid level with the delivery side of the outlet orifice.

10. Apparatus according to claim 3, wherein the inlet control element is a tubular element that is axially adjustable, as by screwing, in the head of the container.

11. Apparatus according to claim 3, having an inlet control element that is axially movable in the head of the container and adjusting mechanism for effecting movement of the inlet control element.

12. Apparatus according to claim 3, having the inlet control element mounted in fixed relation to the head of the container, the said head being axially adjustable.

13. Apparatus for delivering a constant flow of liquid under a constant head maintained in relation to the outlet of the apparatus and adapted for regulation of the flow of liquid, comprising a container through which the flow of liquid is maintained and within which the constant head of liquid is established, the said container having an adjustable inlet orifice and an outlet orifice, an inflow regulating element responsive to the liquid level in the container and arranged to adjust the head of liquid in accordance with the adjustment of the inlet orifice, and an outflow regulating element in the container responsive to the variations in the head of liquid and adapted to vary the effective area of the outlet orifice correspondingly the outlet orifice and outflow regulating element being so arranged that a rise in the head of liquid as accompanied by an increase in the effective area of the outlet orifice.

CYRIL HARRY EVANS.